March 4, 1958 A. B. COLE 2,825,131
VARIABLE THICKNESS SLICING DEVICE
Filed Oct. 19, 1953 2 Sheets-Sheet 1
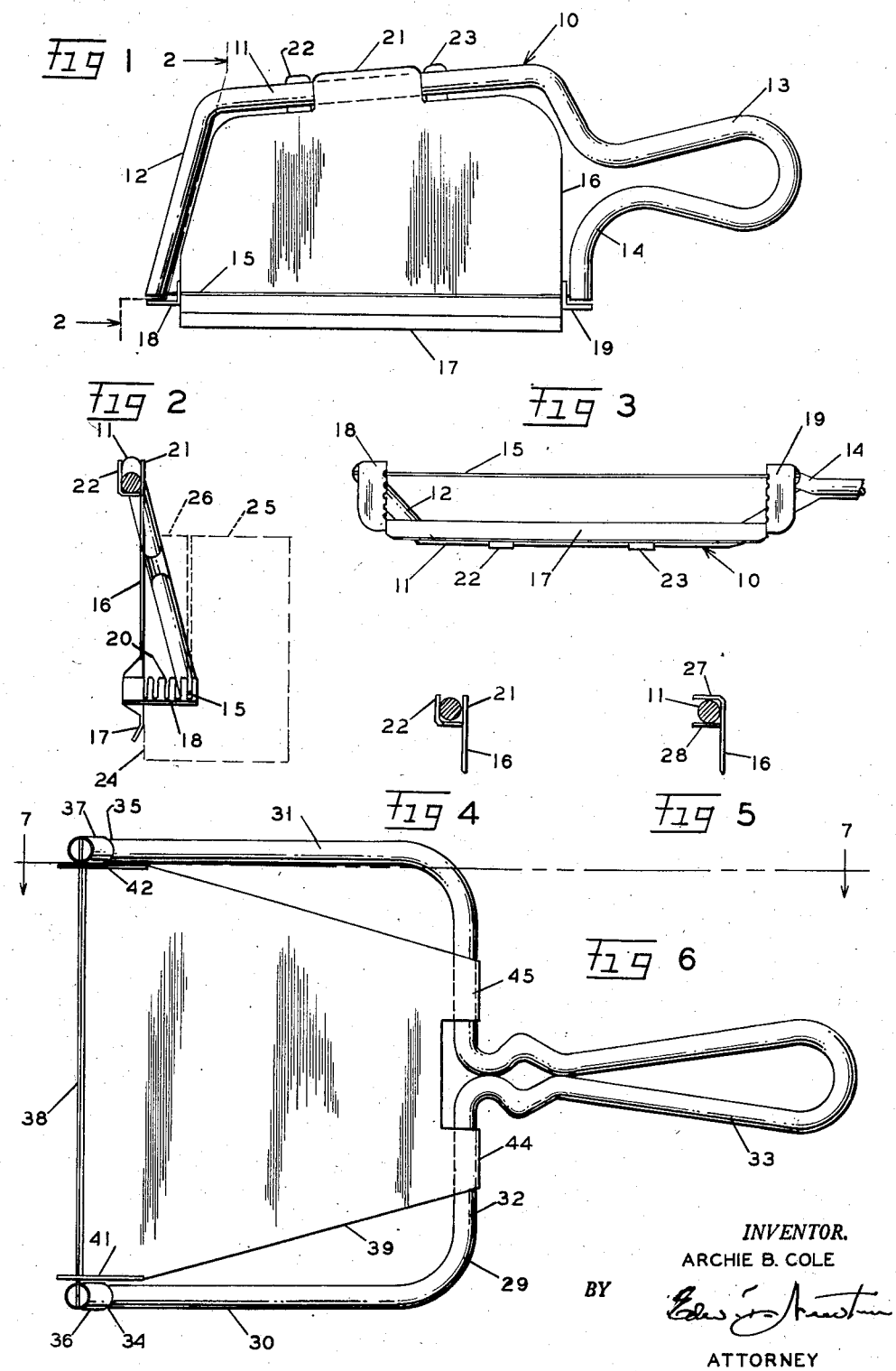
INVENTOR.
ARCHIE B. COLE
BY
ATTORNEY

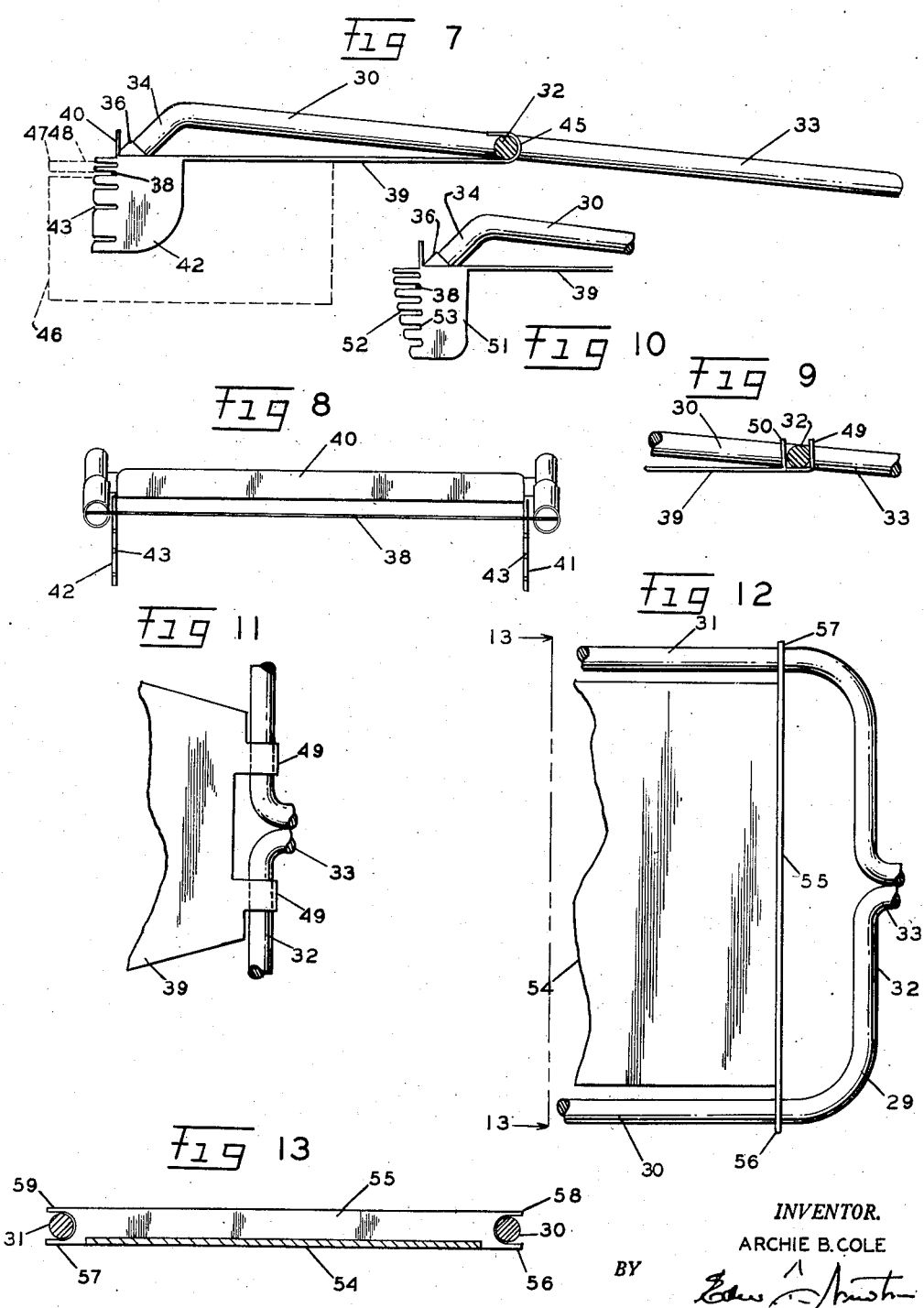

United States Patent Office 2,825,131
Patented Mar. 4, 1958

2,825,131

VARIABLE THICKNESS SLICING DEVICE

Archie B. Cole, Forest Park, Ga.

Application October 19, 1953, Serial No. 386,713

8 Claims. (Cl. 30—116)

This invention relates to the culinary arts and more particularly to a device or implement for slicing food products such as cheese, to a predetermined thickness.

Briefly stated, this invention contemplates the use of a slicing or cutting implement in which the cutting blade comprises a relatively fine tensioned wire. Cutting implements of this nature are old and well known, but considerable difficulty has been experienced in their use since there is nothing to guide the wire or cutting element, such as would be the case with a relatively wide knife, which often results in a wavy or irregular cut which is highly undesirable. It has also been extremely difficult, with the prior art devices, to produce slices of a uniform or predetermined thickness and, consequently, the present invention contemplates the inclusion on a more or less conventional slicer, of a guide for insuring a straight cut, which guide is also adjustable, to produce a slice of predetermined thickness.

It is therefore, an object of this invention to provide a slicing implement incorporating means for insuring a straight cut and for producing slices of uniform and predetermined thickness.

A further object of the invention is the provision of a slicing implement utilizing a wire cutting element and incorporating an adjustable guide, which may be set to produce slices of uniform and predetermined thickness.

A still further object of the invention is the provision of a slicing implement incorporating an adjustable guide for producing slices of uniform and predetermined thickness, in which the guide may be adjusted by a relatively simple, manual manipulation without the necessity of utilizing tools.

Another object of the invention is the provision of a slicing implement incorporating an adjustable guide for facilitating the production of slices of uniform and predetermined thickness, which guide may be conveniently removed from the implement to permit normal cutting or slicing operations.

A further object of the invention is the provision of a slicing implement incorporating an adjustable guide for producing slices of uniform and predetermined thickness, which guide is so formed as to be easily cleaned thereby preventing food contamination.

A still further object of the invention is the provision of a slicing implement incorporating an adjustable guide for producing slices of uniform and predetermined thickness, which guide may be formed of readily available material and which may be economically produced by relatively simple stamping operations, thus providing a device which may be readily sold in a highly competitive market.

Further objects and advantages of the invention will be apparent from the following description taken in conjunction with the accompanying drawings wherein:

Fig. 1 is a side elevational view of a slicing implement constructed in accordance with this invention;

Fig. 2, a sectional view on the line 2—2 of Fig. 1 and showing the adjusting means for the guide and the manner of operation of the device for producing a slice of uniform and predetermined thickness;

Fig. 3, a fragmentary, bottom plan view of the slicing implement shown in Fig. 1;

Fig. 4, a fragmentary, sectional view showing one manner of releasably attaching the guide to the frame of the slicing implement;

Fig. 5, a fragmentary, sectional view similar to Fig. 4 and showing a modified means for attaching the guide to the frame of the slicing implement;

Fig. 6, a side elevational view of a modified form of slicing implement constructed in accordance with this invention;

Fig. 7, a sectional view on the line 7—7 of Fig. 6, and showing the manner of operation thereof;

Fig. 8, a bottom plan view of the modified form of slicing implement shown in Fig. 6;

Fig. 9, a fragmentary, sectional view showing a modified means for attaching the cutting guide to the frame of the implement;

Fig. 10, a fragmentary, end elevational view showing a modified form of adjustable means for use with the guide attaching means shown in Fig. 9;

Fig. 11, a fragmentary, side elevational view of the means for attaching the guide to the frame of the implement as shown in Fig. 9;

Fig. 12, a fragmentary, side elevational view of a further modified form of slicing guide; and Fig. 13, a sectional view on the line 13—13 of Fig. 12.

With continued reference to the drawing there is shown, in Figs. 1 to 3, a slicing implement comprising a frame 10 formed of relatively heavy wire or rod stock and having a back member 11, a front end member 12, projecting angularly therefrom and a handle member 13 formed by bending the wire or rod stock, the handle member terminating in a rear end member 14 substantially opposite the front member 12. A cutting element 15 in the form of a relatively thin wire, may be secured to the front member 12 and the rear member 14, adjacent the ends thereof by welding or any other suitable means and prior to securing of the wire 15 in place, the members 12 and 14 will be moved toward each other a relatively short distance and after securing the wire 15 will be released to place the same, under substantial tension. The structure thus provided, is somewhat similar to the familiar scroll or coping saw with the wire 15 taking the place of the customary sawblade.

The slicing implement, above described, is more or less conventional and while the same is entirely satisfactory for making a cut in cheese or other relatively soft food products, nevertheless, considerable difficulty has been experienced in obtaining a comparatively straight cut and in obtaining slices of uniform and predetermined thickness.

In order to alleviate these difficulties, a cutting guide is provided by this invention, such guide including a substantially flat plate 16, of aluminum, stainless steel or other suitable material, which plate is of generally rectangular formation and of a size to be received within the space defined by the ends 12 and 14, and the back 11 of the frame 10. The plate 16 terminates at its lower edge, in an outwardly inclined flange 17, the purpose of which will be later described, and on the front and rear edges of the plate 16 there are provided laterally extending ears 18 and 19. Ears 18 and 19 may if desired, be formed integral with the guide plate 16, by a stamping operation or they may be separately produced and attached to the edges of the plate 16 by welding or any other suitable means.

Ears 18, and 19, as shown in Fig. 2, may be provided with a plurality of upwardly opening spaced slots 20, which are adapted to selectively receive the wire cutting element 15. The guide plate 16 may be provided on its upper edge, with an extension 21 for engaging the side of the back member 11 of frame 10 and at each side of the extension 21 there may be provided offset tabs 22 and 23 for engaging the opposite sides of the back member 11 of frame 10. Tabs 22 and 23 may be bent slightly toward the extension 21, in order to tightly and resiliently engage the back member 11.

The operation of this form of the invention is best shown in Fig. 2 and it is to be noted, that the distance from the face of the guide plate 16 to the end surface 24 of a block 25 of cheese or other food product, determines the thickness of a slice 26 to be cut therefrom. As will be seen, from an inspection of this figure, it is only necessary to move the plate 16 downwardly until the wire cutting element 15 is disengaged from a pair of slots 20 and to position the wire 15 over the desired pair of slots 20 which will space the guide plate 16 the desired distance from the cutting element 15. At this time, the plate 16 may be moved upwardly until the extension 21 and ears 22 and 23 firmly engage on each side of the back member 11 of the frame 10 to hold the plate 16 firmly in position with the wire cutting element 15 disposed in the desired pair of slots 20, in the ears 18 and 19. It is then only necessary to engage the flange 17 with the end face 24 of the block 25 of cheese or other food product and move the frame 10 downwardly while maintaining the surface of guide plate 16 in engagement with end face 24, which will result in cutting a slice 26 of uniform and predetermined thickness.

Obviously, the plate 16 may be easily removed to permit normal use of the cutting implement, where a guide is not necessary or for permitting convenient cleaning of the cutting implement and guide plate.

A modified means for attaching the guide plate 16 to the back member 11 of frame 10, is shown in Fig. 5 and this may well comprise an angularly disposed flange 27 extending over the upper side of the back member 11 of frame 10 and spaced angularly disposed tabs 28 extending beneath the back member 11. This form of attaching means serves to prevent inadvertent downward movement of the plate 16 with a consequent disengagement of the wire cutting element 15 from the slots 20.

A modified form of slicing implement incorporating a guide means is shown in Figs. 6, 7 and 8 and this may well include a generally U-shaped frame 29 having generally parallel spaced side members 30 and 31 connected by a back member 32 from which extends a handle 33, formed integrally with the frame 29 or attached thereto as desired. The lower ends of side members 30 and 31 are angularly offset, as shown at 34 and 35 respectively, and these offset ends may be provided with sleeves 36 and 37 for securing a wire cutting element 38 to the side members 30 and 31. The cutting element 38 is attached to the side members 30 and 31 in such a way as to maintain the wire 38 under tension, in a manner well known in the art.

An appropriate guide means in the form of a plate 39 may be disposed in the space between the side members 30 and 31 and the back member 32 of the frame 29 and the outer edge of the plate 39 may be provided with an angularly disposed strengthening or reinforcing flange 40. Adjacent the outer edge of the plate 39 and extending laterally at substantially right angles thereto, from each side edge of the plate 39 are ears 41 and 42, which may be provided with outwardly opening, spaced, substantially parallel slots 43. Slots 43 are adapted to selectively receive the wire cutting element 38. The wire 38 may be maintained in the appropriate pair of slots 43 by spaced hook portions 44 and 45 extending from the inner edge of plate 39 on opposite sides of the handle 33 and resilient and releasably engaging the back member 32 of the frame 29 to hold the plate 39 in position.

The operation of this form of the invention is best shown in Fig. 7 and in this case, a block 46 of cheese or other food product is placed on end on a suitable support and the wire cutting element 38 determines the thickness of the slice 47 and it is only necessary to place the surface of the guide plate 39 in engagement with the end face 48 of the block 46 of cheese or other food product and pull the slicing implement toward the user whereby the wire cutting element 38 is pulled through the block 46 of cheese or other food product to produce the slice 47. As before, the guide plate 39 may be conveniently removed from the slicing implement, in order to permit normal use of the same or facilitate cleaning of the various parts.

A modified form of attaching means for the guide plate 39 is shown in Figs. 9, 10 and 11 and in accordance therewith, the plate 39 may be provided with laterally extending spaced resilient ears 49 and 50, which may resiliently and releasably engage the back member 32 of the frame 29 on opposite sides of the handle 33. Since, in this form of the invention the plate 39 is not movable longitudinally of the frame 29, as in the form shown in Figs. 6, 7 and 8 and since, when adjusting the plate 39 for slices of different thickness, the same swings in an arc about the back member 32 of the frame 29, the plate 39 is provided with laterally extending ears 51 having spaced, substantially parallel slots 52 and with the outer edges 53 of the ears 51 being formed on an arc about the back member 32 of frame 29.

In this form of the invention, it is only necessary to disengage the ears 49 and 50 from the back member 32 of frame 29, at which time, the wire cutting element 38 may be disposed in the desired pair of slots 52 and the ears 49 and 50 reengaged with the back 32 of the frame 29. The cutting or slicing operation of this form of the invention is the same as that described above, in connection with the form shown in Figs. 6, 7 and 8.

A still further modified form of the invention is shown in Figs. 12 and 13, in which a guide plate 54 is provided at its inner edge with a flange 55 which may be formed integral with the plate 54, or attached thereto by welding or any other desired means. The flange 55 extends beyond each side edge of the guide plate 54 and these extensions 56 and 57 are slotted at 58 and 59 respectively, to slidably receive the side members 30 and 31 of the frame 29. The slots 58 and 59 provide sufficient clearance to permit rocking of the plate 54 and since such plate is also slidable on the side members 30 and 31 of the frame 29, the plate 54 may be provided with slotted laterally extending ears similar to those shown at 41 and 42 in Figs. 6, 7 and 8. The operation of this form of the invention will be the same as that described above, in connection with Figs. 6, 7 and 8.

It will be seen that by this invention, there has been provided a very simple and inexpensive, yet highly effective implement for permitting the slicing of cheese or other similar food products, or in fact, any relatively soft materials in uniform slices of predetermined thickness, which implement may be quickly and conveniently adjusted or disassembled for cleaning or other purpose and which is sufficiently rugged to prevent inadvertent breakage or damage. The implement may furthermore, be manufactured in mass production by relatively simple stamping operations which effectively maintains the cost thereof, at a minimum.

It will be obvious to those skilled in the art, that various changes may be made in the invention, without departing from the spirit and scope thereof and therefore, the invention is not limited by that which is shown in the drawing and described in the specification, but only as indicated in the appended claims.

What is claimed is:

1. A slicing implement comprising in combination with a generally rectangular frame open at one side and including side members, a back member and a cutting element extending between said side members, an adjustable slicing guide comprising a plate disposed in the space defined by said back member and said side members and spaced laterally from said cutting element, ears extending laterally from opposite side edges of said plate, spaced, substantially parallel, open ended slots in said ears for selectively receiving said cutting element to vary and maintain the spacing between said cutting element and said plate and means for releasably securing the inner edge of said plate to said back member whereby a slice of uniform predetermined thickness may be obtained.

2. A slicing implement comprising in combination with a generally rectangular frame open at one side and including side members, a back member and a wire cutting element extending between said side members, an adjustable slicing guide comprising a plate disposed in the space defined by said back member and said side members and spaced laterally from said cutting element, integral ears extending laterally from opposite side edges of said plate, spaced, substantially parallel, open ended slots in said ears for selectively receiving said cutting element to vary and maintain the spacing between said cutting element and said plate and means for securing the inner edge of said plate to said back member whereby a slice of uniform predetermined thickness may be obtained.

3. A slicing implement comprising in combination with a generally rectangular frame open at one side and including side members, a back member and a wire cutting element extending between said side members, an adjustable slicing guide comprising a plate disposed in the space defined by said back member and said side members and spaced laterally from said cutting element, ears extending laterally from opposite side edges of said plate, spaced, inwardly opening slots in said ears for selectively receiving said cutting element to vary and maintain the spacing between said cutting element and said plate, an extension on the inner edge of said plate engaging one side of said back member, spaced offset tabs at each side of said extension engaging the opposite side of said back member to releasably secure said plate to said back member and an inclined guide flange on the outer edge of said plate whereby a slice of uniform predetermined thickness may be obtained.

4. A slicing implement comprising in combination with a generally rectangular frame open at one side and including side members, a back member and a wire cutting element extending between said side members, an adjustable slicing guide comprising a plate disposed in the space defined by said back member and said side members and spaced laterally from said cutting element, ears extending laterally from opposite side edges of said plate, spaced, inwardly opening slots in said ears for selectively receiving said cutting element to vary and maintain the spacing between said cutting element and said plate, an extension on the inner edge of said plate engaging one side of said back member and spaced offset tabs at each side of said extension engaging the opposite side of said back member to releasably secure said plate to said back member whereby a slice of uniform predetermined thickness may be obtained.

5. A slicing implement comprising in combination with a generally rectangular frame open at one side and including side members, a back member and a wire cutting element extending between said side members, an adjustable slicing guide comprising a plate disposed in the space defined by said back member and said side members and spaced laterally from said cutting element, ears extending laterally from opposite side edges of said plate, spaced, inwardly opening slots in said ears for selectively receiving said cutting element to vary and maintain the spacing between said cutting element and said plate and spaced laterally extending pairs of tabs adjacent the inner edge of said plate engaging said back member to releasably secure said plate to said back member whereby a slice of uniform predetermined thickness may be obtained.

6. A slicing implement comprising in combination with a generally U-shaped frame including side members, a back member and a wire cutting element extending between said side members, an adjustable slicing guide comprising a plate disposed in the space defined by said back member and said side members and spaced laterally from said cutting element, ears extending laterally from opposite side edges of said plate, spaced, open ended slots in said ears for selectively receiving said cutting element to vary and maintain the spacing between said cutting element and said plate, a reinforcing flange on the outer edge of said plate and spaced hook portions on the inner edge of said plate engaging said back member to releasably secure said plate to said back member whereby a slice of uniform predetermined thickness may be obtained.

7. A slicing implement comprising in combination with a generally U-shaped frame including side members, a back member and a wire cutting element extending between said side members, an adjustable slicing guide comprising a plate disposed in the space defined by said back member and said side members and spaced laterally from said cutting element, integral ears extending laterally from opposite side edges of said plate, spaced, substantially parallel, open ended slots in said ears for selectively receiving said cutting element to vary and maintain the spacing between said cutting element and said plate, a reinforcing flange on the outer edge of said plate, spaced laterally extending pairs of tabs adjacent the inner edge of said plate engaging said back member to releasably secure said plate to said back member and said slots being disposed along an arc having said back member as a center whereby a slice of uniform predetermined thickness is obtained.

8. A slicing implement comprising in combination with a generally U-shaped frame including side members, a back member and a wire cutting element extending between said side members, an adjustable slicing guide comprising a plate disposed in the space defined by said back member and said side members and spaced laterally from said cutting element, ears extending laterally from opposite side edges of said plate, spaced, open ended slots in said ears for selectively receiving said cutting element to vary and maintain the spacing between said cutting element and said plate, spaced laterally extending tabs adjacent the inner edge of said plate engaging said back member to releasably secure said plate to said back member and said slots being disposed along an arc having said back member as a center whereby a slice of uniform predetermined thickness is obtained.

References Cited in the file of this patent

UNITED STATES PATENTS

| | | |
|---|---|---|
| 1,533,445 | Moller | Apr. 14, 1925 |
| 2,461,796 | Wilquin | Feb. 15, 1949 |
| 2,475,824 | Devine | July 12, 1949 |
| 2,538,426 | Olander | Jan. 16, 1951 |
| 2,611,952 | Chambers | Sept. 30, 1952 |

FOREIGN PATENTS

| | | |
|---|---|---|
| 129,868 | Sweden | Oct. 24, 1950 |